(12) United States Patent
Hartwig et al.

(10) Patent No.: US 9,285,526 B2
(45) Date of Patent: Mar. 15, 2016

(54) LIGHTING FIXTURE HAVING AN OPTICAL WAVE GUIDE AND A DESCARTES LENS OR DESCARTES REFLECTOR

(75) Inventors: Ulrich Hartwig, Berlin (DE); Matthias Morkel, Berlin (DE); Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 431 days.

(21) Appl. No.: 13/501,088

(22) PCT Filed: Oct. 6, 2010

(86) PCT No.: PCT/EP2010/064901
§ 371 (c)(1),
(2), (4) Date: Apr. 9, 2012

(87) PCT Pub. No.: WO2011/042458
PCT Pub. Date: Apr. 14, 2011

(65) Prior Publication Data
US 2012/0195059 A1    Aug. 2, 2012

(30) Foreign Application Priority Data
Oct. 9, 2009    (DE) .......................... 10 2009 048 830

(51) Int. Cl.
| F21V 7/04 | (2006.01) |
| H01L 33/00 | (2010.01) |
| G02B 6/00 | (2006.01) |
| G09F 13/00 | (2006.01) |
| F21V 8/00 | (2006.01) |
| F21V 5/04 | (2006.01) |
| F21V 7/00 | (2006.01) |
| F21K 99/00 | (2010.01) |
| F21V 5/00 | (2015.01) |

(52) U.S. Cl.
CPC ................ G02B 6/0008 (2013.01); F21V 5/04 (2013.01); F21V 7/0091 (2013.01); F21K 9/00 (2013.01); F21V 5/00 (2013.01)

(58) Field of Classification Search
CPC ...... G02B 6/4298; G02B 6/0008; G02B 6/02; G02B 6/24; G02B 6/2552; G02B 19/0028; F21V 7/0091; F21V 5/04; F21V 5/00; F21V 5/008; F21V 5/041
USPC .......................................... 362/551–582, 810
See application file for complete search history.

(56) References Cited

U.S. PATENT DOCUMENTS 1,872,643 A  *  8/1932  Bone ............................. 359/534
4,361,863 A  *  11/1982  Hagner ......................... 362/551
4,869,580 A     9/1989  Silverglate
(Continued)

FOREIGN PATENT DOCUMENTS

| DE | 100 62 103 | 7/2002 |
| DE | 101 39 011 | 2/2003 |

(Continued)

*Primary Examiner* — Evan Dzierzynski
*Assistant Examiner* — Erin Kryukova
(74) *Attorney, Agent, or Firm* — Cozen O'Connor

(57) ABSTRACT

A light guiding structure comprising a light guiding element (2) optically connected to a light source (6) and an optical element (10) coupled thereto, wherein the surface of the optical element (10) remote from the light guiding element (2) has the shape of a section (11) of a rotational ellipsoid, wherein a geometric cutting plane of the section (11) extends approximately at right angles to the longitudinal axis of the rotational ellipsoid.

8 Claims, 3 Drawing Sheets

(56) References Cited

U.S. PATENT DOCUMENTS

| | | | |
|---|---|---|---|
| 5,398,171 A * | 3/1995 | Davenport et al. | 362/551 |
| 5,429,635 A * | 7/1995 | Purcell et al. | 606/15 |
| 5,436,806 A | 7/1995 | Kato | |
| 5,499,166 A * | 3/1996 | Kato et al. | 362/559 |
| 5,581,683 A * | 12/1996 | Bertignoll et al. | 385/146 |
| 5,626,412 A * | 5/1997 | Kato et al. | 362/551 |
| 5,675,677 A * | 10/1997 | Davenport et al. | 385/31 |
| 5,697,690 A * | 12/1997 | Okuchi et al. | 362/551 |
| 6,152,872 A * | 11/2000 | Peck et al. | 600/160 |
| 6,350,041 B1 * | 2/2002 | Tarsa et al. | 362/231 |
| 6,369,925 B1 | 4/2002 | Agurok et al. | |
| 6,819,505 B1 * | 11/2004 | Cassarly et al. | 359/726 |
| 6,880,958 B2 * | 4/2005 | Swarovski | 362/392 |
| 7,021,797 B2 * | 4/2006 | Miñano et al. | 362/355 |
| 7,201,499 B2 * | 4/2007 | Komatsu | 362/346 |
| 7,228,033 B2 * | 6/2007 | Bhagavatula et al. | 385/35 |
| 7,329,029 B2 * | 2/2008 | Chaves et al. | 362/329 |
| 7,661,860 B2 * | 2/2010 | De Lamberterie | 362/516 |
| 7,926,994 B2 * | 4/2011 | Parkin | 362/552 |
| 2005/0111084 A1 | 5/2005 | Mandella | |
| 2008/0123349 A1 * | 5/2008 | Chaves et al. | 362/329 |

FOREIGN PATENT DOCUMENTS

| | | |
|---|---|---|
| DE | 101 39 010 | 3/2003 |
| DE | 10 2007 018 996 | 10/2008 |
| DE | 10 2005 011 337 | 5/2009 |
| EP | 0 857 913 | 8/1998 |
| EP | 1 283 127 | 2/2003 |
| JP | 2003-515899 | 5/2003 |
| JP | 2005-276678 | 10/2005 |
| JP | 2007-109532 | 4/2007 |
| JP | 2007-512580 | 5/2007 |
| WO | WO 2006/054199 | 5/2006 |

* cited by examiner

LIGHTING FIXTURE HAVING AN OPTICAL WAVE GUIDE AND A DESCARTES LENS OR DESCARTES REFLECTOR

RELATED APPLICATIONS

This is a U.S. national stage of application No. PCT/EP2010/064901 filed Oct. 6, 2010. This application claims the priority of German application no. 10 2009 048 830.8 filed Oct. 9, 2009, the entire content of which is hereby incorporated by reference.

FIELD OF THE INVENTION

The invention is based on a light guiding structure having a light guiding element optically connected to a light source and an optical element coupled thereto.

BACKGROUND OF THE INVENTION

The document WO 2006/054199 A1 discloses such a light guiding structure. Said light guiding structure has a light source, for example an LED or an element which emits laser light, which is optically connected to a rod-shaped optical wave guide. An end portion of the optical wave guide remote from the light source is configured with a specific structure or comprises a specific shape which serves to influence the radiation characteristic of the light beams. Thus the radiation characteristic of the light source is altered by the light guiding structure such that the light approximately radiates, for example, as in a halogen lamp or gas discharge lamp.

A drawback with this solution is that the structures in the end portion of the optical wave guide reduce the transmitted radiation power of the light source and by the disclosed radiation characteristic prevent an effective transmission of the light of the source in a target area.

SUMMARY OF THE INVENTION

One object of the present invention is to provide a light guiding structure for altering a radiation characteristic of a light source, which is of simple design and is efficient.

According to one aspect of the invention, a light guiding structure comprises a light source which is optically connected to a light guiding element. Moreover, an optical element is coupled to the light guiding element, the surface of said optical element remote from the light guiding element being configured in the shape of a section of a rotational ellipsoid, wherein a geometric cutting plane of the section extends approximately at right angles to the longitudinal axis of the rotational ellipsoid.

This solution has the advantage that a secondary light source is generated by the light of a primary light source conducted by the light guiding structure, the location and radiation thereof (the latter by the design of the elliptical surface) being able to be adapted advantageously to the application or a subsequent optical system, wherein the location differs from that of the primary light source and, for example, is able to be positioned in the focal point of an optical system. In this manner it is achieved that mechanical components of the primary light source such as shafts, power supply lines or heat sinks do not impair the optical transmission.

The light guiding element is preferably of rod-shaped configuration, and is optically connected to the primary light source via a light admitting aperture, and is coupled to the optical element via a light emitting aperture.

The longitudinal axis of the light guiding element and the longitudinal axis of the optical element preferably extend approximately coaxially to one another.

In a further embodiment of the invention, the light emitting aperture of the light guiding element is arranged approximately in a first focal point of the ellipsoidal optical element, whereby the light emerging from the optical element is collimated.

In a further preferred embodiment of the invention the approximately rotationally ellipsoidal section of the optical element is mirrored, whereby the light beams are focused in the second focal point of the ellipsoidal surface and spread out from there into the rear half space. A secondary light source produced in this manner at this location is, therefore, able to be advantageously positioned in the focal point of a reflector or the immediate vicinity thereof such that said reflector reflects all the light thereof.

The reflector may, for example, be configured to be elliptical or parabolic. By the optical imaging thus described, the light coupled into the light guiding element and transmitted thereby may be transmitted from its light emitting aperture to a target without its light density being substantially reduced.

So that the light beams reflected from the mirrored light emitting section, when emerging from the optical element, are not deflected by refraction on the surface in an uncontrolled manner, the surface facing the guiding element is preferably of hemispherical configuration, wherein the center point of the hemispherical section is arranged approximately in the second focal point of the ellipsoidal emitting section or is slightly offset thereto.

The light guiding element and the optical element are connected together in a non-positive and/or positive manner.

The optical element consists, for example, of a plastics material and the light guiding element consists of a glass.

BRIEF DESCRIPTION OF THE DRAWINGS

The invention is to be described in more detail hereinafter with reference to the exemplary embodiments. In the drawings.

DETAILED DESCRIPTION OF THE DRAWINGS

Figure 1:
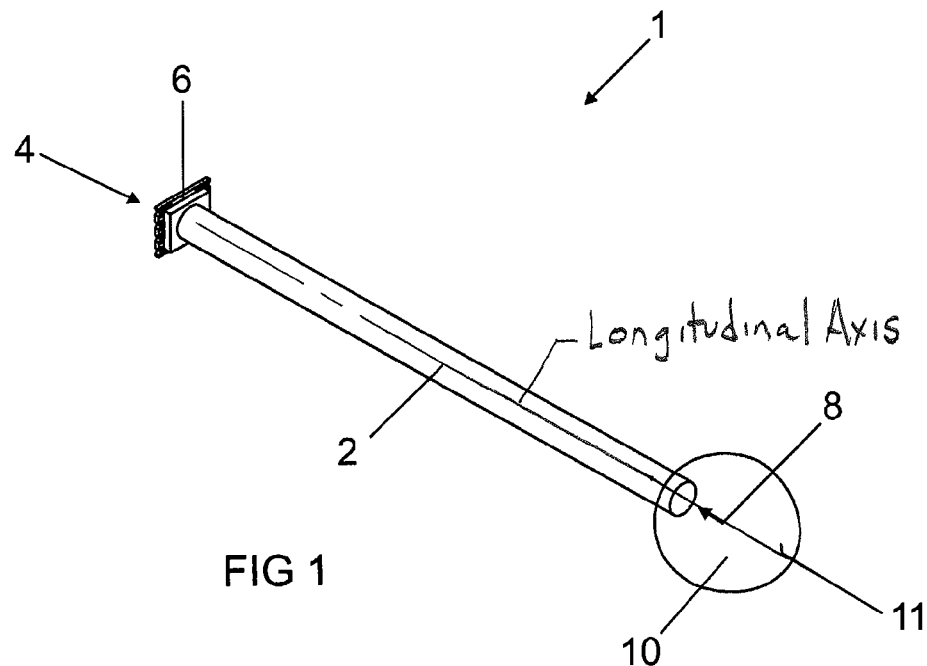
FIG. 1 shows in a perspective view a light guiding structure according to a first exemplary embodiment.

In FIG. 1 a light guiding structure 1 according to a first exemplary embodiment is shown in a perspective view. Said light guiding structure has an approximately rod-shaped light guiding element 2 which is optically connected via a light admitting aperture 4 to a light source 6, for example an LED. Light beams of the light source 6 are then conducted through the light guiding element 2 to a light emitting aperture 8 and into an optical element 10 arranged thereon with a light emitting section 11 formed according to a section of a rotational ellipsoid.

Figure 2:
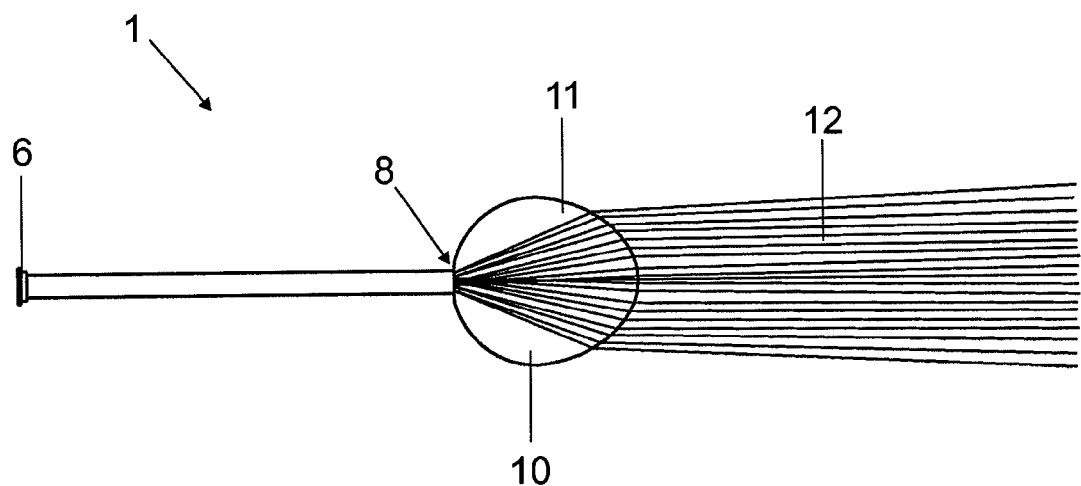
FIG. 2 shows in a side view the light guiding structure according to the first exemplary embodiment.

FIG. 2 discloses the light guiding structure 1 of FIG. 1 in a side view. In this case it can be seen that light beams emitted by the light source 6 enter the optical element 10 in an approximately conical manner after the light emitting aperture 8, and are collimated by the light emitting section 11 formed according to a section of the rotational ellipsoid, when emerging from the optical element 10. A geometric cutting plane of the light emitting section 11 extends approximately at right angles to the rotational axis of the rotational ellipsoid and faces towards the light guiding element 2. A numerical eccentricity of the ellipsoid—as known to the person skilled in the art—is selected according to $$e = \frac{1}{n}$$

where n is the refractive index of the medium from which the optical element 10 is constructed.

Figure 3:
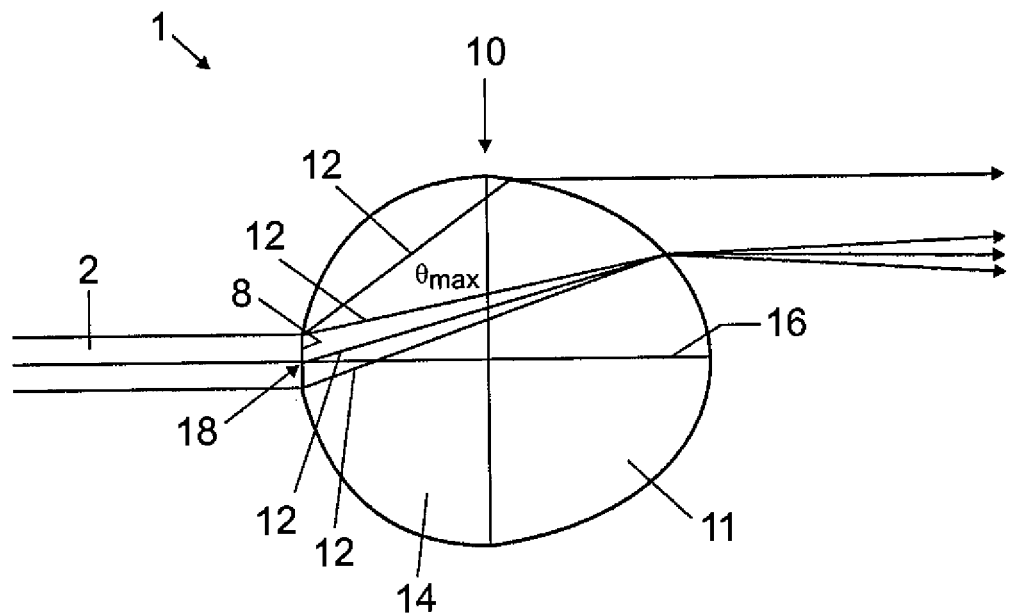
FIG. 3 shows in a schematic view light beams in the light guiding structure according to the first exemplary embodiment.

FIG. 3 shows in a schematic side view a part of the light guiding structure 1 according to the first exemplary embodiment. In this case, the construction of the optical element 10 may be seen. Adjacent to the light emitting section 11, said optical element has a hemispherical section 14 facing the light guiding element 2, whereby the optical element 10 is embodied as approximately egg-shaped. The longitudinal axes 16 of the light emitting section 11, of the hemispherical section 14 and of the light guiding element 2 extend approximately coaxially relative to one another.

The light emitting aperture 8 of the light guiding element 2 is arranged approximately in the first focal point 18 of the light emitting section 11 of the optical element 10 formed according to a section of a rotational ellipsoid.

The optical element 10 may be produced from a cost-effective plastics material, since by means of the light guiding element 2 said material is kept away from the high temperatures in the region of the light source 6, whereby damage to the plastics material due to high temperatures is avoided. The light guiding element 2 consists, for example, of glass, whereby said light guiding element has a sufficient mechanical stability in order to hold the optical element 10.

The optical element 10 is connected to the light guiding element 2 by a non-positive, material and/or positive connection. The elements 2, 10 are, for example, bonded by immersion and/or the optical element 10 has a recess in which the light guiding element penetrates in a non-positive and/or positive manner.

Figure 4:
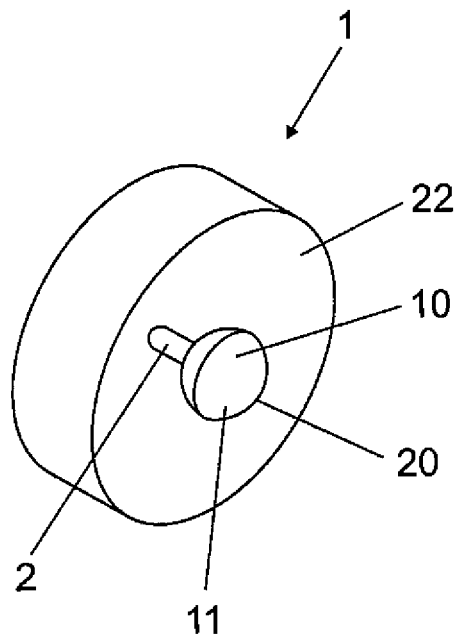
FIG. 4 shows in a perspective view the light guiding structure according to a second exemplary embodiment.

FIG. 4 shows the light guiding structure 1 according to a second exemplary embodiment in a perspective view. The rotationally ellipsoidal surface or the light emitting section 11 of the optical element 10 in this case has a mirrored surface 20, which deflects the light beams through the optical element 10 onto a reflector 22. The elliptical reflector 22 is passed through approximately centrally by the light guiding element 2, wherein the longitudinal axes of the light guiding element 2 and the reflector 22 coincide.

Figure 5:
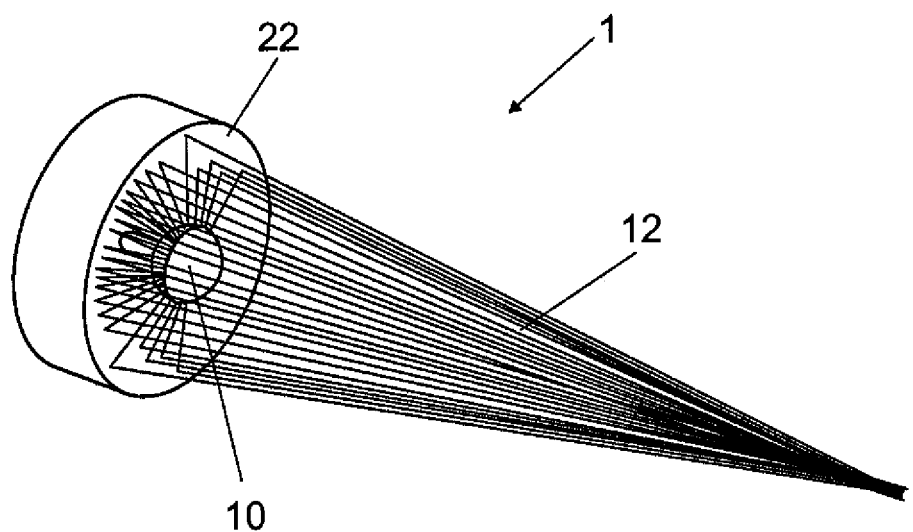
FIG. 5 shows in a perspective view the light guiding structure according to the second exemplary embodiment.

FIG. 5 shows the light guiding structure 1 of FIG. 4 with light beams 12. In this case, it can be seen that said light beams are oriented by the optical element 10 in the direction of the reflector 22, and reflected thereby. In the second exemplary embodiment according to FIG. 5, the light beams 12 are then bundled by the reflector 22.

Figure 6:
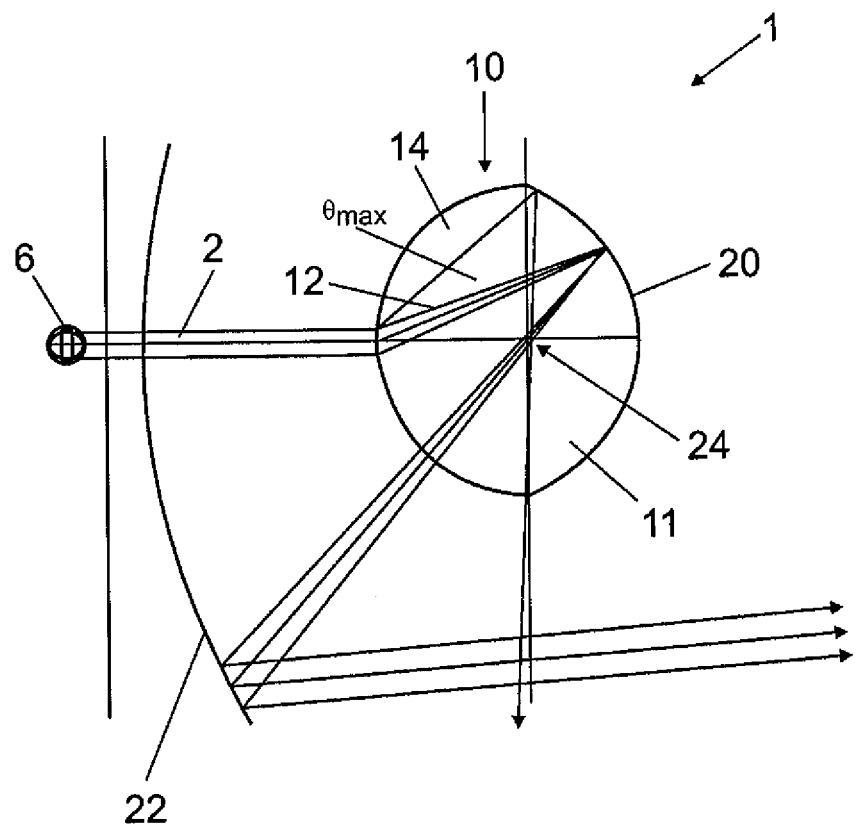
FIG. 6 shows in a schematic view light beams in the light guiding structure according to the second exemplary embodiment.

FIG. 6 discloses the light guiding structure 1 in a schematic side view according to the second exemplary embodiment. The light beams 12 emerging from the light guiding element 2 enter the ellipsoidal light emitting section 11 via the hemispherical section 14 are reflected on the mirrored surface 20 of the light emitting section 11 in the direction of a second focal point 24 of the light emitting section 11, pass through the hemispherical section 14 again, emerge via said hemispherical section from the optical element 10, strike the reflector 22 and are reflected thereby. By the shape of the hemispherical section 14 and by the approximately perpendicular impingement of the light beams 12, the direction thereof is barely affected, for example by refraction.

A secondary light source is substantially produced in the second focal point 24, therefore, said secondary light source being illuminated by the light of the primary light source 6.

As is visible in particular in FIGS. 4 and 5, the reflector 22 encompasses the hemispherical section 14 of the optical element 10 approximately hemispherically, whereby all light beams 12 reflected from the surface 20 impinge on said hemispherical section. The first focal point of the reflector is arranged in this example in the second focal point 24 of the ellipsoidal surface 20.

It is conceivable that a plurality of LEDs are used in the light source, which also radiate in various colors. Said light beams 12 are then mixed by the light guiding element 2. Then the mixing can take place using dichroic beam splitters in front of the light guiding element 2.

The light beams are entirely reflected within the light guiding element 2.

The diameter of the light guiding element 2 is able to be adapted to the size of the light source 6.

The larger the optical element 10 relative to the diameter of the light guiding element 2, the more accurately the radiation characteristic of the light beams 12 may be influenced. The size of the optical element 10 is, however, limited by the mechanical stability of the light guiding element 2 bearing the optical element 10.

Moreover, the size of the optical element 10 in comparison with the size of the reflector 22 is limited so that it vignettes the reflected light bundle as little as possible.

The light from different light sources 6 may be coupled into the light guiding structure 1, said light sources being able to be substituted in any manner. The different light sources then have in each case the same radiation characteristic through the light guiding structure 1.

Moreover, it is conceivable to use the light guiding structure 1 according to the second exemplary embodiment of FIGS. 4 to 6, for retrofitting lights with a reflector which is already present. Fields of use are thus, for example, front and rear lamps of automobiles, surgical operating lamps, dental lamps or miscellaneous lamps such as floor lamps.

A light guiding structure with a light source is disclosed, said light guiding structure being connected to an optical element via a light guiding element. The optical element comprises in this case a partially ellipsoidal section.

The invention claimed is:
1. A light guiding structure comprising:
a light source that outputs a light;
a light guiding element optically connected to the light source;
an optical element coupled to the light guiding element,
wherein a surface of the optical element remote from the light guiding element has a shape of a section of a rotational ellipsoid,
wherein a geometric cutting plane of the section extends approximately at right angles to a longitudinal axis of the rotational ellipsoid,
wherein the light guiding element is approximately rod-shaped and has a light admitting aperture optically connected to the light source and a light emitting aperture coupled to the optical element,
wherein the optical element has a hemispherical section facing the light guiding element; and
a reflector at least partially encompasses the hemispherical section, wherein a section of the surface of the optical element is mirrored to reflect substantially all of the light from the light source towards the reflector.

2. The light guiding structure as claimed in claim 1, wherein a longitudinal axis of the light guiding element and a longitudinal axis of the optical element extend approximately coaxially to one another.

3. The light guiding structure as claimed in claim 1, wherein the light emitting aperture of the light guiding element is arranged approximately in a first focal point of the surface of the optical element formed as the section of the rotational ellipsoid.

4. The light guiding structure as claimed in claim 1, wherein the light guiding element and the optical element consist of a medium with approximately the same refractive index.

5. The light guiding structure as claimed in claim 1, wherein a center point of the hemispherical section is located approximately in a second focal point of the mirrored section of the surface of the rotational ellipsoid, or is slightly offset from the second focal point along the longitudinal axis.

6. The light guiding structure as claimed in claim 1, wherein a first focal point of the reflector is arranged in a second focal point of the ellipsoidal surface of the optical element or is arranged in the immediate vicinity of the second focal point.

7. The light guiding structure as claimed in claim 1, wherein the light guiding element and the optical element are connected together.

8. The light guiding structure as claimed in claim 1, wherein the optical element consists of a transparent plastics material and the light guiding element consists of glass.

\* \* \* \* \*